United States Patent [19]

Myers

[11] Patent Number: 4,760,680

[45] Date of Patent: Aug. 2, 1988

[54] FIBERGLASS GRATING FORMED OF INTERLOCKED PULTRUDED FIBERGLASS GRATING BARS

[76] Inventor: Robert E. Myers, 18507 Prince Wm La., Houston, Tex. 77058

[21] Appl. No.: 42,904

[22] Filed: Apr. 27, 1987

[51] Int. Cl.$^4$ .............................................. E04C 2/42
[52] U.S. Cl. ...................................... 52/669; 52/664; 52/668
[58] Field of Search ................ 52/660, 663, 664, 666, 52/668, 669

[56] References Cited

U.S. PATENT DOCUMENTS

| | | | |
|---|---|---|---|
| 2,509,732 | 5/1950 | Ernestus | 189/82 |
| 3,044,586 | 7/1962 | Cassels | 189/82 |
| 3,308,594 | 3/1967 | Ashworth | 52/669 X |
| 3,340,781 | 9/1967 | See | 94/13 |
| 3,540,178 | 11/1970 | Altissimo | 52/669 |
| 3,748,814 | 7/1973 | Cribben | 52/668 |
| 3,927,624 | 12/1975 | Hewson | 108/56 |
| 3,927,950 | 12/1975 | Herrmann et al. | 52/668 X |

FOREIGN PATENT DOCUMENTS

| | | | |
|---|---|---|---|
| 2606349 | 8/1977 | Fed. Rep. of Germany | 52/663 |
| 789008 | 1/1958 | United Kingdom | 52/664 |
| 929494 | 6/1963 | United Kingdom | 52/668 |
| 2106948 | 4/1983 | United Kingdom | 52/660 |

*Primary Examiner*—David A. Scherbel
*Assistant Examiner*—Creighton Smith

*Attorney, Agent, or Firm*—Sughrue, Mion, Zinn, Macpeak & Seas

[57] ABSTRACT

A fiberglass reinforced molded resin grating is formed of first and second sets of mutually parallel, interlocking fiberglass reinforced molded resin bars with the sets extending transversely to one another. One set consists of bearing bars of rectangular cross section including at longitudinally spaced positions within an upper edge, inverted U-shaped notches including oppositely directed, downwardly and outwardly oblique slots terminating at their upper ends adjacent the upper edge of the bearing bars in upwardly and outwardly diverging oblique cam surfaces. The second set of bars consist of cross bars of inverted U-shaped cross section including a horizontal base portion and a pair of downwardly and outwardly diverging legs of a thickness equal to the width of the diverging slots and being respectively received in said slots. The legs of the cross bars at longitudinally spaced position are provided with rectangular locking notches from the free ends upwardly of a width generally equal to the thickness of the bearing bars and of a height which is less than the vertical height of the cross bars. The cross bars are forced downwardly at the locking notches into the inverted U-shaped notches formed within the upper edge of the bearing bars with the cam surfaces deflecting the oblique legs of the cross bar to momentarily deform the legs to cause the portions of the legs at the locking notches to snap into the oblique slots of the inverted U-shaped notches within the bearing bars to mechanically interlock the first and second sets of the bars together.

2 Claims, 1 Drawing Sheet

FIBERGLASS GRATING FORMED OF INTERLOCKED PULTRUDED FIBERGLASS GRATING BARS

FIELD OF THE INVENTION

This invention relates to a molded fiberglass reinforced grating and more particularly to a grating formed of pultruded fiberglass reinforced resin grating bars which are mechanically interlocked.

BACKGROUND OF THE INVENTION

Fiberglass reinforced resin grating structures are currently in vogue since the encapsulating resin is highly corrosion resistant, offers significantly high resistance to fire and may be used in environments where sparking will not be tolerated as for instance in the liquid hydrocarbon processing field or for decks in marine vessels and the like.

Where, such fiberglass grating has been manufactured by compression molding of right angle intersecting cross bars with appropriate glass fiber strands within the mold cavities to provide the necessary glass fiber reinforcement, the size of grating sections is relatively small due to the limitations on the size of compression mold and on the mechanism for laying up the reinforcing glass fibers, within the mold cavities.

Attempts have been made to alleviate this problem by manufacturing grating components such as longitudinal bars, cross bars and the like by a pultrusion process. Such a pultrusion process requires the pulling of reinforcement fibers through a liquid resin bath and into a heated shaping die. The molten resin thermostats within the die producing a continuous solid part. While these components have to a large degree cost advantages over the compression molded counterpart grating, problems are experienced in coupling the longitudinal bars or bearing bars.

In one known type of pultrusion formed fiberglass reinforced resin grating, sold under the trademark DURADEK by Aligned Fiber Composites of Chatfield Minnesota, a number of bearing bars, which may be from six inches to 240 inches in length and manufactured by pultrusion, are positioned side-by-side, parallel to each other and laterally spaced by several inches. Holes are predrilled through the sides of the bearing bars at longitudinally spaced positions and the grating is assembled by inserting standard cross tie rods through the aligned holes of respective bearing bar. The tie rods are of circular cross section and have a diameter on the order of that of the holes drilled or otherwise formed within the bearing bars. Suitable adhesives are employed for adhesively locking the tie rods to the bearing bars in the areas of intersection. Problems of hole alignment occur. Such gratings are costly due to the dimensional tolerances needed to ensure proper coupling between the tire rods and the bearing bars and the prealignment needed between the rods and holes, prior to rod insertion. Additionally, the holes are drilled through the sides of the bearing bar along the longitudinal center line measurably weakening the bearing bars and thus limiting the overall strength of the completed grating to resist torsion, bending and the like loads.

It is therefore a primary object of the present invention to provide an improved fiberglass reinforced molded resin grating of pultruded bearing bars and intersecting right angled cross bars coupled in a manner which minimizes the loss in strength of the grating due to the coupling between those components, wherein coupling is effected by mechanical deformation of the cross bar when coupled to the bearing bar and wherein, the deflection required of the cross bar is self-induced as a result of a mechanical locking of the cross bars to the bearing bar.

SUMMARY OF THE INVENTION

A fiberglass reinforced molded resin grating is formed of first and second sets of mutually parallel, interlocking fiberglass reinforced molded resin bars which sets extend transverse to one another. The first set of bars comprises underlying bearing bars of rectangular cross section having opposite sides and upper and lower edges, being of a thickness T and having a height H. Each bearing bar includes at longitudinally spaced positions within said upper edge, inverted U-shaped notches of vertical depth D including oppositely, downwardly and outwardly oblique slots. Said oblique slots terminate adjacent the upper edge of the bearing bar in outwardly and upwardly diverging, oppositely oblique cam surfaces which are spaced apart at the top edge by a distance W'. The second set of interlocking fiberglass reinforced molding bars constitute cross bars, are of inverted U-shaped cross section including inwardly, a horizontal base portion and a pair of downwardly and outwardly diverging legs of a thickness equal to the width of the diverging slots of the inverted U-shaped notches within the bearing bar. The cross bars are of a vertical height H" in excess of the vertical depth D of the inverted U-shaped notches within the bearing bar. The cross bars have a flat horizontal upper edge, and oblique outwardly diverging sides with a cross bars including, at longitudinally spaced positions, rectangular locking notches within respective legs. The locking notches are of a width W" which is generally equal to the thickness T of each bearing bar and of a height H' which is less than the vertical height H' of the cross bar. The locking notches form laterally opposed vertical edges which contact the opposite sides of the bearing bar and form horizontal edges for the rectangular locking notches within the legs of the cross bar which are spaced laterally from each other by a distance S which is less than the distance W' between the upper edges of the oppositely oblique camming surfaces at the upper ends of the oblique slots of the inverted U-shaped notches within the bearing bar. As a result, the portion of the cross bar legs above the locking notches are deflected inwardly during forceable insertion of the cross bars, at the locking notches, into the inverted U-shaped notches of the bearing bars by the camming action of said camming surfaces at the upper ends of the bearing bar oblique slots. Momentarily deformation of the cross bar legs permits entry thereof into the inverted U-shaped notch slots of the bearing bar. The cross bars are thus joined to the bearing bars with the faces of the oblique legs of the cross bars flush with the oblique surfaces of the downwardly and outwardly oblique slots within the bearing bar, thereby preventing removal of the cross bars from the bearing bar inverted U-shaped notches, after completion of the assembly of the grating.

DESCRIPTION OF THE PREFERRED EMBODIMENT

Figures 1, 2:
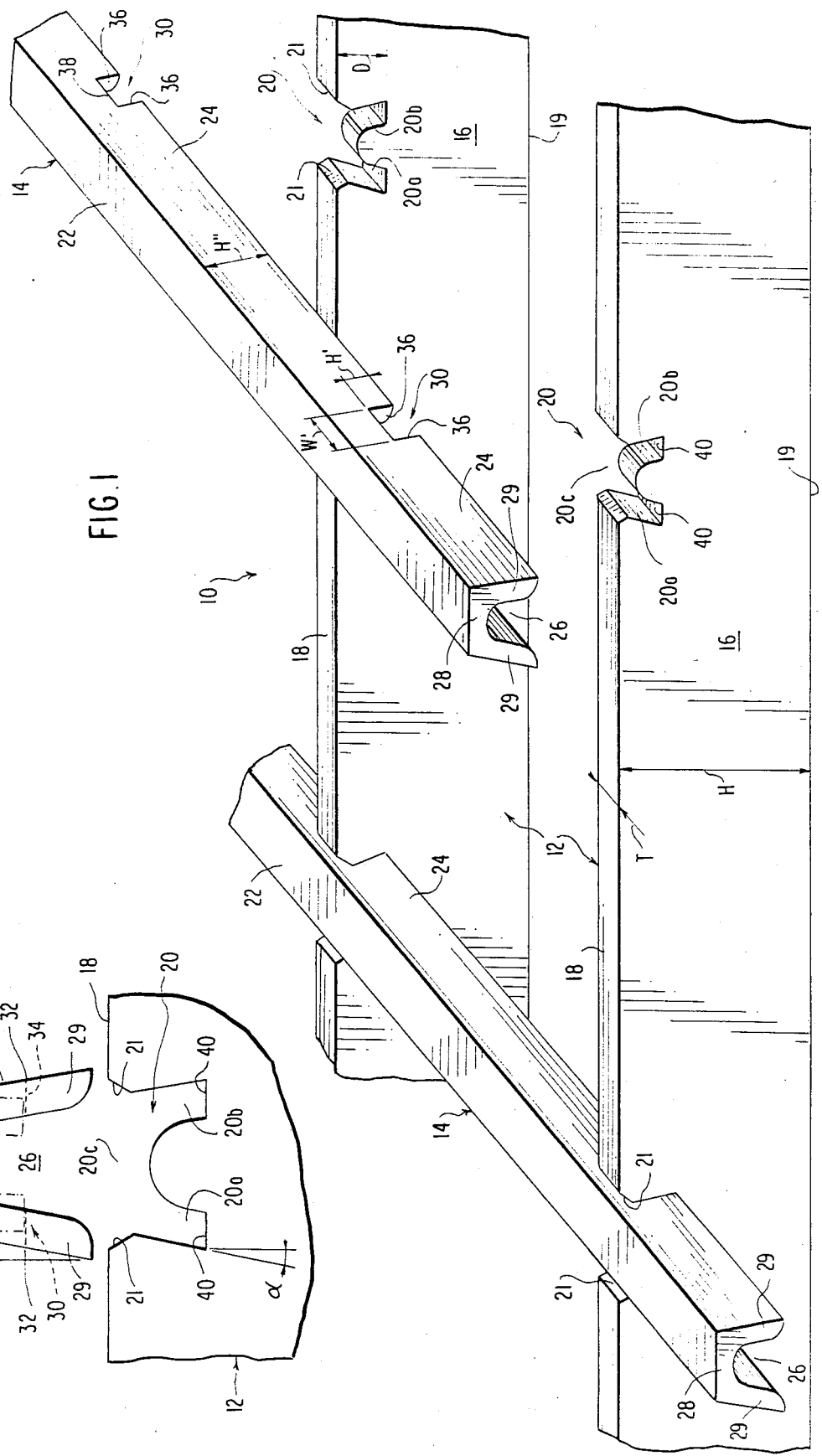
FIG. 1 is a prespective, partially exploded view of a portion of a fiberglass reinforced molded resin grating utilizing pultrusion formed, mechanically interlocked bearing bars and cross bars and forming a preferred embodiment of the invention.
FIG. 2 is an enlarged, exploded view of a portion of the grating shown in FIG. 1 illustrating the nature in which cross bars are mechanically locked to bearing bars at each right angle intersection between those members.

Referring to the drawings, the grating 10 to which the invention is particularly adapted is shown in part in the drawings as formed of a plurality of preferably pultrusion drawn fiberglass reinforced molded resin grating bars disposed in a cross-like pattern. The grating 10 is comprised of a plurality of spaced, parallel bearing bars indicated generally at 12 and spaced, parallel cross bars 14 arranged so that the upper edges 18, 22, respectively are disposed in the same horizontal plane and together present a flat supporting surface. The bars 12, 14 are secured together by a mechanical interlock resulting from a deformation provided to the cross bars 14 at the area of intersection with the bearing bars 12, at longitudinally spaced positions the bearing bars 12 are somewhat more massive than the cross bars 14; they have a rectangular cross section with a thickness T which is several times the height H of the bearing bars. The bearing bars 12 are formed with opposite vertical side faces or surfaces 16, an upper edge or top surface 18 and a bottom edge or bottom surface 20. At longitudinally spaced postions, and with in the upper edge 18, there are formed inverted U-shaped notches, indicated generally at 20, with diverging diagonal slots 20a, 20b, which open at the top to an enlarged recess or opening 20c forming the base portion of the inverted U-shaped notch 20. There are two specific features with respect to the inverted U-shaped notches 20 within the bearing bar. The first has to do with the fact that the slots 20a, 20b diverge away and downwardly from the upper edge 18 such that they are at an angle α with respect to a vertical line which is perpendicular to the upper edge 18 of the bearing bar within which the inverted U-shaped notches are formed. Secondly, in the forming of the inverted U-shaped notches 20, the edges of the oblique slots 20a, 20b, where they meet the top edge 18 of the bearing bar are beveled outwardly and away from each other to form camming surfaces 21 for camming inwardly, the opposed sides 24 of cross bar 14 when a cross bar 14 is mechanically coupled to a bearing bar 12 in each area of intersection between the cross bars and bearing bars.

In that respect, each cross bar 14 is proved with a series of rectangular locking notches, indicated generally at 30, at longitudinally spaced locations along each cross bar 14. They are of a given vertical height H' and of given longitudinal width W'. The width W of the notch 30 corresponds to the thickness T of the bearing bar 12 and the vertical height from the lower edge 34 of the cross bar to its upper edge 22 is equal to the vertical depth D of the oblique slots, 20a, 20b of the inverted U-shaped notch 20 within the bearing bar 12.

Each cross bar 14 is also preferably of pultruded fiberglass reinforced molded resin and has an inverted U-shaped cross sectional configuration which matches that of the inverted U-shaped notch 20 within the bearing bar 12, with the exception that the overall height H" of the cross bar 14 is in excess of the depth D of the inverted U-shaped notch 20. The cross bars 14 are formed with oblique diverging legs 29 forming oblique sides 24 which are at an angle β with the perpendicular to the upper edge 22 of the cross bar 14. Preferably angle β equals 10°. A longitudinal slot 26 is formed within the lower edge 34 of each cross bar and gives to each cross bar a cross sectional configuration which is of inverted U-shape similar to that of the U-shaped notches 20 within each bearing bar 12. The configuration provides the oblique legs 29 which extend from and are integral with a horizontal or transverse base 28 from which the legs 29 depend. The configuration and size of the cross bar is similar to that of the inverted U-shaped notch 20. Further, the lateral width W' of each rectangular locking notch 30 within the cross bar legs 24 is equal to the thickness T of the bearing bar such that, when mechanically linked as shown in FIG. 1, the laterally opposed, vertical edges 36 of the inner rectangular locking notch 30 abut opposite, vertical side faces 16 of the bearing bar. Further, the horizontal edge 38 of the rectangular locking notches 30 mate with the bottom surfaces 40 of the oblique slots 20a, 20b with the bearing bar 12.

The mechanical coupling between the various cross bars 14 and the various right angle bearing bars 12, as seen from the figures, results from a mechanical deflection of areas of the opposed sides 24 of the cross bar 14 when, the edges 32 of the rectangular locking notches 30 of cross bars 14 engage the beveled camming surfaces 21 edges of the inverted U-shaped notch slots 20a, 20b within the underlying bearing bar 12. When the cross bar 14 is driven downwardly, from the position shown in FIG. 2, the cross bar 14 forces its side walls 24 adjacent to the edges 32, to cam inwardly so as to deflect towards a near vertical position. FIG. 2, rather than the outwardly oblique or flared position normal to the sides 24 and for legs 29 of the cross bar 14. The distance S between edges 32 of the cross bar 14 is less than the distance W" between the upper edges of the camming surfaces 21 for slots 20. The dotted line position shown in FIG. 2 for the legs 29, indicates the effect created by contact of the edges 32 of the cross bar at each locking notch 30, when pressed downwardly into contact with the oblique camming surfaces 21 formed by the inverted U-shaped notches 20 within the bearing bar, at longitudinally spaced positions. Thus, the cross bars 14 being notched at 30 as per the drawings, when forced down, into place within the bearing bar notches 20, cause local distortion of the cross bar legs to permit the cross bar sides 24 to enter the inverted U-shaped notch cross bar receiving area in the bearing bars 12 at points of intersection between the cross bars and the bearing bars. Further, the rectangular locking notch 30 in the cross bar 14 prevents the cross bar 14 from shifting along its axis thereby maintaining a preset center to center distance between bearing bars.

This occurs because the opposed side walls 36 of each notch 30 engage the respective sides 16 of the bearing bar at areas immediately below the bottoms 40 of the oblique slots 20a, 20b of the inverted U-shaped notch 20.

Additionally, since the slots 20 within the bearing bars 12 are at an angle α which is equal to the angulation β of legs 29 of the cross bar 14, the 10° oblique incline given to the cross bar legs 30 prevents the cross bar 14 from rising back out of the 10° slots 20a, 20b, after being forced into those slots 20a, 20b by the camming action between edges 32 of the rectangular locking notch 30, and the oblique camming surfaces 21 at the upper ends of slots 20a, 20b at each inverted U-shaped notch 20 of the bearing bar.

This arrangement replaces the common practice of forcing round rods through aligned holes within the bearing bars as discussed above in conjunction with known practice. The inverted U-shaped notches 20 are of an appropriate depth D and the rectangular locking notches 30 are of an appropriate height H' above the lower edge 34 of the cross bar to ensure that the upper edge 32 of the cross bar is flush with the upper edge 18 of the bearing bar at each cross connection. Further, an appropriate adhesive is employed for adhesively fixing the cross bar to the drawing bar at the notched intersections between those two members, i.e., at each cross point between a crossing bar 14 and an underlying bearing bar 12. The construction of the grating 10 provides a very strong structure which can be quickly assembled without a special tool and in which the bars are securely mechanically and interlocked and braced against each other at the areas of intersection due to the interlocking relationship of notches 20, 30. Coupling is effected, via the resilience of the cross bar legs 29 which allows momentarily mechanical deformation, and then return to original oblique divergence of the legs 29 to prevent the cross bars 14 from simply lifting out of the inverted U-shaped notches 20 within the bearing bars receiving the same.

In achieving the deflection necessary to permit the edges 32 of the cross bar legs 29 to enter the oblique slots 20a, 20b within the inverted U-shaped notches 20 of the bearing bar, the deflection from diverging 10° to generally right angle position with respect to the upper edge 22 of the cross bar is achieved due to the inherent resiliency of the pultrusion molded fiberglass reinforced resin cross bars 14 whose configuration is likewise of inverted U-shape. In effect, a "snap locking" action occurs with the cross bar reverting to its original configuration, once seated, as indicated to the left in FIG. 1.

In a typical grating formed of interlocked pultruded fiberglass grating bars, the cross bars 14 may have an overall vertical height of 0.5 inches, the lateral width at the upper edge may be 0.515 inches, the transverse width of the locking notches may be 0.370 inches with a vertical height of 0.14 inches and the width of the oblique legs may be 0.125 inches.

For the bearing bars, the bearing bars may be of a vertical height equal to 1.5 inches, with a thickness equal to 0.365 inches. As to the notches within the bearing bars 12, the notch dimensions correspond exactly to the width and leg thickness dimensions of the cross bar inverted U-shaped cross sectional dimensions. A circular arc at a 0.1875 radius is employed to form the portion of the notch recess joining the oblique slots. The overall depth of the notches within the upper edge of the bearing bar may be equal to 0.34 inches and the oblique camming surfaces 21 at the upper ends of the oblique slots being at an angle of 140° with respect to the legs of the slots. The oblique slots 20a, 20b are at an angle $\alpha$ of 10° corresponding to the oblique angle $\beta$ given to the legs of the inverted U-shaped cross bars 14.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A fiberglass reinforced molded resin grating comprising:

first and second sets of mutually parallel, interlocking fiberglass reinforced molded resin bars, which sets extend transversely to one another;

said first set of bars comprising underlying bearing bars of rectangular cross section having opposite sides and upper and lower edges, being of a thickness T and having a height H, each bearing bar, including at longitudinally spaced positions within said upper edge, inverted U-shaped notches of vertical depth D including oppositely directed, downwardly and outwardly oblique slots, said oblique slots terminating adjacent the upper edge of said bearing bar in outwardly and upwardly diverging, oblique cam surfaces which are spaced apart at said top edge by a distance W''', said second self interlocking fiberglass reinforced molded bars constituting cross bars, being of inverted U-shaped cross section including integrally, a horizontal base portion and a pair of downwardly and outwardly diverging legs of a thickness equal to the width of the diverging slots of the inverted U-shaped notches within said bearing bars and being of a vertical height H', in excess of the vertical depth D of said inverted U-shaped notches within said bearing bars, said cross bars having a flat horizontal upper edge, and oblique outwardly diverging sides, said cross bars including, at longitudinally spaced positions, rectangular locking notches within respective legs and being of a width W' which is generally equal to the thickness T of the bearing bar and of a height H' which is less than the vertical height H'' of said cross bars, said locking notches forming laterally opposed vertical edges which contact the opposite sides of the bearing bars and forming horizontal edges for said rectangular locking notches within the legs of the cross bars, which horizontal edges, are spaced from each other by a distance S on opposite sides of said cross bars which is less than the distance W''' between the upper edges of the oppositely oblique camming surfaces at the upper ends of the oppositely oblique slots of the inverted U-shaped notches within the bearing bars, whereby; the portion of the cross bar legs above the locking notches are deflected inwardly during forced insertion of the cross bars at the locking notches into the inverted U-shaped notches of the bearing bars by camming action of the camming surfaces at the upper end of the oblique slots to momentarily deform the cross bar legs to permit entry thereof into the inverted U-shaped notch slots of the bearing bars whereupon, said cross bar is joined to the bearing bars with the oblique legs of the cross bars snapping flush with oblique surfaces of the downwardly and outwardly oblique slots within the bearing bars thereby preventing removal of the cross bars from the bearing bar inverted U-shaped notches by frictional surface contact and resilient pressure between the oblique legs of the cross bars and the slots within the bearing bars, after completion of assembly of the grating.

2. The fiberglass reinforced molded resin grating as claimed in claim 1 wherein the vertical height of the locking notches within the legs of the cross bars are dimensioned relative to the overall height of the cross bar and the depth of the inverted U-shaped notches within the bearing bars such that the upper edges of the cross bars and bearing bars are flush upon completion of the mechanical interlock between the cross bars and bearing bars at said locking notches.

* * * * *